United States Patent
Overstreet (10) Patent No.: US 8,060,390 B1
(45) Date of Patent: Nov. 15, 2011

(54) COMPUTER BASED METHOD FOR GENERATING REPRESENTATIVE QUESTIONS FROM AN AUDIENCE

(75) Inventor: William Overstreet, Knoxville, TN (US)

(73) Assignee: Voices Heard Media, Inc., Knoxville, TN (US)

( * ) Notice: Subject to any disclaimer, the term of this patent is extended or adjusted under 35 U.S.C. 154(b) by 1116 days.

(21) Appl. No.: 11/604,139

(22) Filed: Nov. 24, 2006

(51) Int. Cl.
*G06Q 10/00* (2006.01)
(52) U.S. Cl. ...................................... 705/7.11
(58) Field of Classification Search ................ 705/7.11
See application file for complete search history.

(56) References Cited

U.S. PATENT DOCUMENTS

| | | | |
|---|---|---|---|
| 5,002,491 A * | 3/1991 | Abrahamson et al. | 434/322 |
| 5,056,021 A | 10/1991 | Ausborn | |
| 5,176,520 A * | 1/1993 | Hamilton | 434/350 |
| 5,371,807 A | 12/1994 | Register et al. | |
| 5,453,015 A * | 9/1995 | Vogel | 434/350 |
| 5,839,438 A | 11/1998 | Graettinger et al. | |
| 5,860,023 A * | 1/1999 | Tognazzini | 710/15 |
| 5,870,755 A | 2/1999 | Stevens et al. | |
| 5,915,256 A | 6/1999 | Rogers et al. | |
| 5,948,054 A | 9/1999 | Nielsen | |
| 5,956,491 A | 9/1999 | Marks | |
| 6,032,177 A | 2/2000 | O'Donnell | |
| 6,074,216 A * | 6/2000 | Cueto | 434/322 |
| 6,246,990 B1 | 6/2001 | Happ | |
| 6,256,664 B1 | 7/2001 | Donoho et al. | |
| 6,263,362 B1 | 7/2001 | Donoho et al. | |
| 6,347,333 B2 | 2/2002 | Eisendrath et al. | |
| 6,363,384 B1 | 3/2002 | Cookmeyer, II et al. | |
| 6,581,073 B1 | 6/2003 | Adler | |
| 6,618,734 B1 | 9/2003 | Williams et al. | |
| 6,684,188 B1 | 1/2004 | Mitchell et al. | |
| 6,701,322 B1 | 3/2004 | Green | |
| 6,755,662 B2 * | 6/2004 | Fujino et al. | 434/322 |

(Continued)

FOREIGN PATENT DOCUMENTS

JP        406044306 A    *   2/1994

OTHER PUBLICATIONS

Kolsch, Mathias et al., Improving Speaker Training with Interactive Lectures University of California, 2003.*

(Continued)

*Primary Examiner* — Scott L Jarrett
(74) *Attorney, Agent, or Firm* — Luedeka, Neely & Graham, PC (57) ABSTRACT

A computer assisted system and related method for interacting with an audience by combining questions from a group of questioners, analyzing the questions, and presenting the questions in summary form for answering by a speaker or interviewee. The answers are then delivered to the questioners. The entire interview may be delivered to the questioners, or portions may be selectively delivered to separate questioners based on questions asked by the respective questioner. In one embodiment, questions may be grouped by similar subject matter; groups may be arranged by the number of associated questions or by other priority criteria. In a further embodiment, a representative question may be generated for each group. The representative question may be selected from the group or may be generated from analysis results. In one embodiment, a subscriber based service is provided. Profiles may be developed for the questioners, and targeted advertising may be delivered based on the profiles.

1 Claim, 9 Drawing Sheets

U.S. PATENT DOCUMENTS

| | | | |
|---|---|---|---|
| 6,766,322 | B1 | 7/2004 | Bell |
| 6,783,460 | B2 | 8/2004 | Galyean, III et al. |
| 6,795,793 | B2 * | 9/2004 | Shayegan et al. ............. 702/179 |
| 6,801,929 | B1 | 10/2004 | Donoho et al. |
| 6,850,889 | B1 | 2/2005 | Zayas, Jr. |
| 6,885,844 | B2 * | 4/2005 | Roschelle et al. ............ 434/350 |
| 6,931,434 | B1 | 8/2005 | Donoho et al. |
| 6,938,029 | B1 | 8/2005 | Tien |
| 6,938,068 | B1 | 8/2005 | Kraft et al. |
| 6,956,593 | B1 * | 10/2005 | Gupta et al. ................. 715/751 |
| 6,970,881 | B1 | 11/2005 | Mohan et al. |
| 6,978,274 | B1 | 12/2005 | Gallivan et al. |
| 6,990,628 | B1 | 1/2006 | Palmer et al. |
| 7,010,570 | B1 | 3/2006 | Boies et al. |
| 7,016,895 | B2 | 3/2006 | Dehlinger et al. |
| 7,024,455 | B2 | 4/2006 | Yokobori et al. |
| 7,034,691 | B1 | 4/2006 | Rapaport et al. |
| 7,062,533 | B2 | 6/2006 | Brown et al. |
| 7,076,456 | B1 | 7/2006 | Rofrano |
| 7,092,821 | B2 * | 8/2006 | Mizrahi et al. .................... 702/1 |
| 7,133,834 | B1 * | 11/2006 | Abelow .......................... 705/10 |
| 7,194,511 | B2 * | 3/2007 | Stettner ......................... 709/205 |
| 7,296,218 | B2 * | 11/2007 | Dittrich ......................... 715/201 |
| 7,392,175 | B2 * | 6/2008 | Kawatani ........................... 704/9 |
| 7,448,063 | B2 * | 11/2008 | Freeman et al. ............. 725/136 |
| 7,454,393 | B2 * | 11/2008 | Horvitz et al. ................. 706/46 |
| 7,487,095 | B2 * | 2/2009 | Hill et al. ....................... 704/275 |
| 7,562,288 | B2 * | 7/2009 | Dittrich ......................... 715/202 |
| 7,590,603 | B2 * | 9/2009 | Zhang et al. .................... 706/12 |
| 7,641,475 | B2 * | 1/2010 | Katsuyama et al. .......... 434/322 |
| 7,733,366 | B2 * | 6/2010 | Beavers et al. ............. 348/14.08 |
| 7,739,116 | B2 * | 6/2010 | Miyamoto et al. ........... 704/270 |
| 2001/0052009 | A1 * | 12/2001 | Desai et al. ................... 709/224 |
| 2002/0023130 | A1 * | 2/2002 | Stettner ......................... 709/205 |
| 2002/0029159 | A1 | 3/2002 | Longden |
| 2002/0040317 | A1 | 4/2002 | Neumeyer et al. |
| 2002/0077888 | A1 | 6/2002 | Chiang |
| 2002/0119433 | A1 | 8/2002 | Callenter |
| 2002/0128892 | A1 | 9/2002 | Farenden |
| 2002/0169631 | A1 | 11/2002 | Lewis |
| 2003/0033161 | A1 | 2/2003 | Walker et al. |
| 2003/0033294 | A1 | 2/2003 | Walker et al. |
| 2003/0071852 | A1 | 4/2003 | Stimac |
| 2003/0078970 | A1 * | 4/2003 | Leaders et al. ................ 709/204 |
| 2003/0196206 | A1 * | 10/2003 | Shusman ........................ 725/91 |
| 2004/0039618 | A1 | 2/2004 | Cardenas-Vasquez |
| 2004/0093263 | A1 * | 5/2004 | Doraisamy et al. ............. 705/11 |
| 2004/0125127 | A1 | 7/2004 | Liu |
| 2004/0153504 | A1 * | 8/2004 | Hutchinson et al. .......... 709/204 |
| 2005/0060175 | A1 | 3/2005 | Farber et al. |
| 2005/0125246 | A1 * | 6/2005 | Muller et al. ...................... 705/1 |
| 2005/0137896 | A1 | 6/2005 | Pentecost et al. |
| 2005/0144024 | A1 | 6/2005 | Wojton et al. |
| 2005/0240457 | A1 | 10/2005 | Connally et al. |
| 2006/0112114 | A1 | 5/2006 | Yu et al. |
| 2006/0184977 | A1 * | 8/2006 | Mueller et al. ................... 725/86 |
| 2007/0099162 | A1 * | 5/2007 | Sekhar .......................... 434/323 |
| 2007/0226215 | A1 * | 9/2007 | Tamaki ............................. 707/7 |
| 2007/0282948 | A1 * | 12/2007 | Praino et al. .................. 709/204 |
| 2008/0040339 | A1 * | 2/2008 | Zhou et al. ......................... 707/5 |
| 2008/0120101 | A1 * | 5/2008 | Johnson et al. ............... 704/235 |
| 2008/0294637 | A1 * | 11/2008 | Liu .................................... 707/6 |
| 2009/0094627 | A1 * | 4/2009 | Lee et al. ........................... 725/9 |
| 2009/0137257 | A1 * | 5/2009 | Barber .......................... 455/466 |

OTHER PUBLICATIONS

Dufresne, Robert J. et al., Classtalk: A Classroom Communication System for Active Learning Journal of Computer in Higher Education, vol. 7, 1996.*

Bar, Henning et al., Evaluation of Digital Interaction Support in a Large Scale Lecture IADIS International Conference on Applied Computing, 2005.*

Li, Xin et al., Learning Question Classifiers Proceedings of the 19th International Conference on Computational Linguistics, 2002.*

Lowery, Roger C., Clickers in the Classroom: A Comparison of Interactive Student-Response Keypad Systems University of North Carolina, Apr. 5, 2006.*

Dumais, Susan, Using SVMs for Text Categorization IEEE Intelligent SYstems, vol. 13, No. 4, Jul./Aug. 1998.*

Brill, Eric et al., Data Intensive Question Answering Proceedings of the Tenth Text Retrieval Conference, TREC 2001, Nov. 2001.*

Landauer, Thomas K. et al., A Solutions to Plato's Problem: The Latent Semantic Analysis Theory of Acuiqistion, Induction and Representation of Knowledge, Psychological Review, vol. 104, No. 2, 1997.*

Yahoo Sports, "Fantasy Sports", Web Page, Nov. 24, 2006.

* cited by examiner

Fig. 8

COMPUTER BASED METHOD FOR GENERATING REPRESENTATIVE QUESTIONS FROM AN AUDIENCE

BACKGROUND

1. Field of the Invention

The present invention pertains generally to the field of digital processing, more particularly to the processing of question and answer information relating to a speaker and an audience.

2. Background of the Invention

Celebrity interviews are typically conducted by a program host (interviewer) who asks questions and interacts with the celebrity to guide the conversation on behalf of the audience. Throughout the interview, the audience, for whom the entire show is produced, cannot participate in the dialog. It is up to the interviewer to figure out the relevant issues of interest to the audience and formulate appropriate questions. Success of the show depends on the interviewer knowing the subject and knowing the audience. There is no mechanism for immediate audience input or feedback as the interview progresses.

In some situations, the interview may be staged before a studio audience to bring audience reaction into the program. The interviewer can gauge the success of a particular line of questioning by eye contact and body language of the audience. The audience may react by applause, laughter, booing and such, but if there is a burning question within the audience, there is typically no way to get the question voiced. Not all program situations allow a studio audience. In such cases the interviewer and celebrity depend entirely on their own skills, without real time feedback, throughout the conduct of the interview.

One attempt to include the audience is by call-in from a few selected callers. A live call-in requires skill on the part of the interviewer, who must now handle a potentially uncooperative caller as well as the celebrity. The unknown caller also presents risk to the network for questions that are irrelevant or of limited interest and thus a waste of time, or for questions that present controversies beyond the intended scope of the program. Further, the live call-in process takes only a very small random sample of audience interests and does not give the interviewer or program directors a direct feel or measure of the major interests of the audience.

A further issue is that in some situations, a particular audience member may have a significant question that the particular audience member feels is of little interest to other audience members. The question would likely never get asked, even though, in fact many other audience members may have similar questions. There is also no mechanism to answer an individual with a particular question.

Another method for getting audience feedback is to conduct a poll. Polls, however, can only answer simple questions, are subject to bias in the question, and cannot articulate a new question.

Other types of interviews, and related speaker/audience situations also suffer from similar issues—nightly news, documentaries, sports interviews, political interviews, seminars, and classroom education.

Thus, there is a need for an interview process that allows more direct audience participation without wasting time or risking adverse questions, a process that better addresses audience concerns and improve speaker contact and communication with the audience.

BRIEF DESCRIPTION OF THE INVENTION

Briefly, the present invention is a computer assisted system and related method for interacting with an audience by combining questions from a group of questioners, analyzing the questions, and presenting the questions in summary form for answer by a speaker or interviewee. The answers are then delivered to the questioners. The entire interview may be delivered to the questioners, or portions may be selectively delivered to separate questioners based on questions asked by the respective questioner. In one embodiment, questions may be grouped by similar subject matter; groups may be arranged by the number of associated questions or by other priority criteria. In a further embodiment, a representative question may be generated for each group. The representative question may be selected from the group or may be generated from analysis results from the group of questions.

In a further embodiment, profiles may be generated associated with each questioner. The profiles may be supplemented based on information in the questions asked by the questioner. A further profile of the population of questioners may be generated. Advertising may be directed to the questioner based on the profile information from either profile. In a further embodiment, an interview service providing access to celebrities through question and answer exchange is provided wherein fees for the service may be charged to the questioners for the service or to advertisers by virtue of advertising delivered to the questioners based on the profile information.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

The present invention pertains to a system and method for a speaker to interact with an audience. The invention is particularly beneficial for a celebrity interview. According to the invention, multiple questions from multiple sources are sent to a central server for processing. Questions may be sent by voice phone, cell phone, text messaging, email, web page form or other communications format. The central server may provide one or more types of analysis on the questions and present the questions and analysis in a summarized form for the speaker or interviewee. The analysis may include grouping the questions into groups of related questions, determining the number of related questions, assigning priority to the questions, and/or generating a representative question for each group of questions. The questions and analysis are then presented for the interviewee. In one embodiment, the representative question for each group of related questions together with the number of related questions in each group is presented, thus distilling a potentially massive number of questions to a few manageable questions while giving the interviewee a sense of which questions were most in demand over the population of questioners. Further, the results may be provided in real time, virtually as fast as the questions come in. The process gives rise to an entirely new form of communications between an interviewee and a group of questioners, between a celebrity and a group of fans, between a teacher and a group of students in a classroom or on the Internet, between a newscaster and an audience, between a celebrity interviewee on a talk show and the listening audience worldwide. The list of applications for the invention is limitless. The process enables interactive communication between a celebrity and the whole of an audience, not just one or two randomly selected questioners. All those in the audience wishing to ask a question may ask the question and influence the list of questions selected for the interview. A given question will affect the number of questions of a related group of questions or will start a new group. Thus, the process gives each person in the audience direct influence in the subject matter of the interview. Such influence will likely increase audience participation and help the celebrity make contact with the center of the audience. Audience participation may be further encouraged by the question-answer feedback process. An audience member calling in a question that is answered gets the feel of being personally answered and having a personal influence in the program.

The process can be interactive. The questions can be processed and summarized virtually as fast as the questions can be entered by the questioners. Thus, questions can be available for answer while the triggering topic is still hot within the minds of the audience and still in play in the course of the interview.

There is no need to interrupt the interview to receive a question from a single audience member—a question which may not represent the central audience interests, or may be off topic, or may be inappropriate. Questions can be screened for those that meet program guidelines and have high audience interest.

Questioners need not put themselves in the spotlight to ask a question. A shy person with stage fright need not go "on the air" to ask a question. Similarly, a person with a question of limited personal interest that the person fears is not of general audience interest may ask the question and possibly be surprised when others ask the same question and get an answer.

The process can be adapted to any size audience over any geographical area. Larger audiences may be accommodated by using more communications resources, more telephone lines, more interfaces, more input processors, and parallel processors comprising the server. Thus, the process can serve any size from a small classroom to the worldwide coverage of a Superbowl or Olympics event.

Using the invention, one may gauge an audience without prejudicing the outcome, i.e., the questions are received without a prompting or framing. In a prior art situation, one may take a poll to investigate how an audience feels about a subject. For the poll, one asks a question for which the respondent gives an answer. The manner in which the question is asked frames the audience mindset by providing built in assumptions and potentially suggesting limited alternatives. The most egregious is a true/false or multiple choice questionnaire, wherein only a few responses are allowed and no allowance is provided for qualifying remarks. With the present invention, however, the audience questions are in response to events and are completely free form with the full range of language available. There are no framing prompts or limits to the choice of words. Thus, a full and accurate measure of each questioner's expression may be accurately represented. The resulting questions together with the number of questions in each group indicates the full range of interests in the audience and pinpoints the focus of greatest interest in the group or groups of questions containing the greatest number of related questions.

In a further embodiment of the invention, a service may be established providing interview services in accordance with the present invention. In one embodiment, the service may register subscribers wherein the subscribers are the ones permitted to ask questions. Subscribers may be paid subscribers or unpaid subscribers. Along with registration, subscribers may provide information that may be used to generate a profile for the subscriber and subscriber profiles may be used to generate a subscriber base profile giving demographic information for all subscribers. Subscriber profiles may be further updated based on the content and context of the questions asked.

In a subscriber based system, all subscribers may not always receive the entire interview. Subscribers may receive only answers relating to the questions asked by a given subscriber. Different subscription levels may provide for viewing all questions and answers or only answers for questions asked by the individual subscriber. Different subscription levels may also be assigned different priorities for questions asked.

In one embodiment, portions of the interview may be devoted to questions of interest to only one or a few questioners. The answers may be delivered to only those questioners, better serving the needs of the few and providing a personal touch to the interview.

A further capability of a subscriber based system is the presentation of targeted advertising to the subscriber. The targeted advertising may be based on profile information for the individual or for the group of subscribers and may further be based on interests expressed through questions asked during interviews. The targeted advertising may be presented in conjunction with any communication with the system such as logging onto the system, any asking a question or receiving an answer. Advertising may generate revenue independently of whether the subscribers are paid or non-paid subscribers.

Figure 1A:
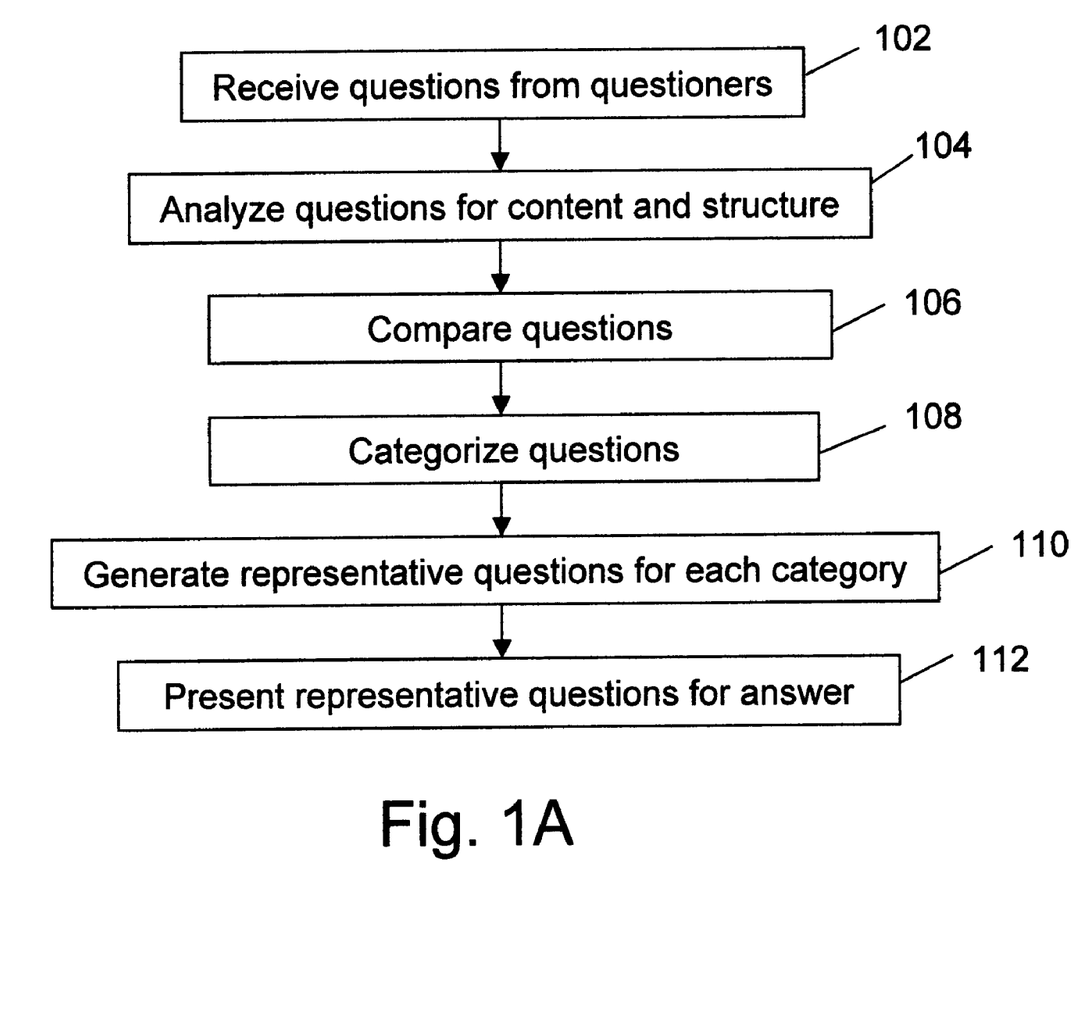
FIG. 1A is an exemplary process flow diagram showing the steps for preparing interview questions in accordance with the present invention.

The invention may be better understood by the following description with reference to the figures:

FIG. 1A is an exemplary process flow diagram showing the steps for preparing questions in accordance with the present invention. Referring to FIG. 1A, in step 102, the system receives questions from the questioners. Each question may then be analyzed for content and structure 104. Synonyms and alternate word forms are identified and spelling is corrected. Keywords are identified. Keywords may include phrases or word groups. A keyword list may be derived from the nouns and verbs used in the questions and/or may include a predefined keyword list manually derived or derived from a previous related event or interview. Sentence structure elements are identified such as the distance (number of characters or words) between keywords and the order of keywords used. The analysis may include other techniques for computer assisted text analysis or text mining as are known in the art. In step 106, sentences are compared. Sentences may be compared by comparing the word analysis results and/or by analyzing and comparing the text directly. In step 108, similar questions are grouped together (also characterized as categorizing or placing in bins.) A particular question may be placed in several groups relating to different keywords. Also a group may split as it accumulates questions and the questions in a group begin to form two or more groups based on other keywords or sentence structure elements.

In one embodiment questions are placed in groups by comparing with other questions. In an alternative embodiment, questions are placed in categories by predetermined criteria, such as a library of keywords.

Table 1 illustrates seven exemplary questions which may be compared in accordance with the present invention. The questions of Table 1 represent exemplary questions that may be asked of a sports celebrity after a game. Table 1 includes five columns: a column for question number, a column for the question, a column for keywords, a column indicating the number of keywords in common for a particular question relative to the other questions in the group, and a column for the group. Questions 1 and 2 may be placed in the same group because of common keywords. Questions 1 and 2 both begin with "what" and include "win." Question 1 gets extra credit for having more keywords and thus may be selected as the representative question for the group. Questions 3 and 4 may be placed in a second group. Questions 3 and 4 both begin with "did you think." Question 3 includes the keyword "win" and question 4 includes the synonym for win "beat." Either question 3 or question 4 may be chosen as the representative question for the group. Alternatively, a composite question may be generated including all of the keywords: "Did you think you would win the game in the last three minutes by 7 to 6." Questions 5-7 may also be placed in a third group because of related keywords. Question 7 has the keyword expect, which is a variant of expectations in question 5. Question 7 also includes playoffs, the same keyword found in question 6. Question 7 has the most keywords in common with the other questions and thus may be selected as the representative question for the third group.

TABLE 1

| No. | Question | Keywords | Common | Group |
|---|---|---|---|---|
| 1 | What did that win mean to you? | what, win, mean, you | 2 | 1 |
| 2 | What about that win? | what, win | 2 | 1 |
| 3 | Did you think you would win the game in the last three minutes? | did you think, win, game, three minutes | 2 | 2 |
| 4 | Did you think you would beat them by 7 to 6? | did you think, beat, them, 7 to 6 | 2 | 2 |
| 5 | What are your expectations for the future? | expectations, future | 1 | 3 |
| 6 | What are your plans for the playoffs? | plans, playoffs | 1 | 3 |
| 7 | What do you expect for the playoffs? | expect, playoffs | 2 | 3 |

Referring again to FIG. 1A, in step 110, a representative question for a group (the group alternatively referred to as a bin or category) is developed. In one embodiment, a question from the group is selected as being most representative of the group. This may be a question that has the most matches or highest matching score with the other questions in the group. Alternatively, a representative question may be synthesized using the analysis elements of the group. Step 110 may be optional, especially for smaller groups with fewer questions. Step 110 provides greater advantage with large groups, such as network broadcast interviews; where reading every question manually is clearly impractical.

In step 112, the results, (including representative questions, if provided) are presented for answer. The results presentation may be provided direct from the computer to the interviewee by using a computer output device such as, by way of example and not limitation, a computer display, a printer, or a text to speech audio channel. Alternatively, the questions may be presented by the computer to a human interviewer that actually asks the questions to the interviewee.

When the representative questions are displayed, the computer may also display the number of related questions and may sort the list of questions according to number of related questions or other priority criteria. In one embodiment, some questioners may be given greater emphasis or authority in asking questions, i.e., some subscribers may pay more for the privilege of greater question authority. Also, the press or members of a related organization may be given greater authority. Thus other factors than the number of questions may influence the determination of question priority.

The interview may be delivered back to the questioner in several ways. In one embodiment, the interview is broadcast to all of the questioners or possibly to a broader audience than the questioners, as in a public broadcast. In another embodiment, the answers, i.e. portions of the interview related to specific questions, are selectively delivered to the respective questioners.

Questions May be Related by Comparing Strings

One method for determining a measure of similarity between questions is by comparing the questions as strings of characters. Each question may be represented in machine format, typically an ASCII string of characters, and the string may be compared character by character to search for substrings of matching characters. The string matching may be performed alone or the results combined with word matching, or content matching (e.g., using synonyms) to determine a final matching score for the match between two questions.

String match, like word match, may include multiple criteria such as the length of the longest matching continuous substring, the total number of matching characters, the sequence of matches, the length of the longest match ignoring missing or extra characters, or other criteria. A composite matching score may be determined as a combination of scores from each of the criteria, such as a weighted sum. For example, two questions may have a maximum match of 40 characters in one continuous substring for a score of 40 on this criterion (equal to the number of matching characters). After a missing character, the match may continue for 20 more characters. So the score may be increased by 20 for the matching characters and decreased by a 10 point penalty for the missing character, so the composite matching score would be 50.

In this manner, each question may be related to, i.e., a measure of similarity determined in relation to, each other question. Alternatively, for a large number of questions, processing speed may be improved by comparing each new question to a representative question for an already established group of questions.

Figure 1B:
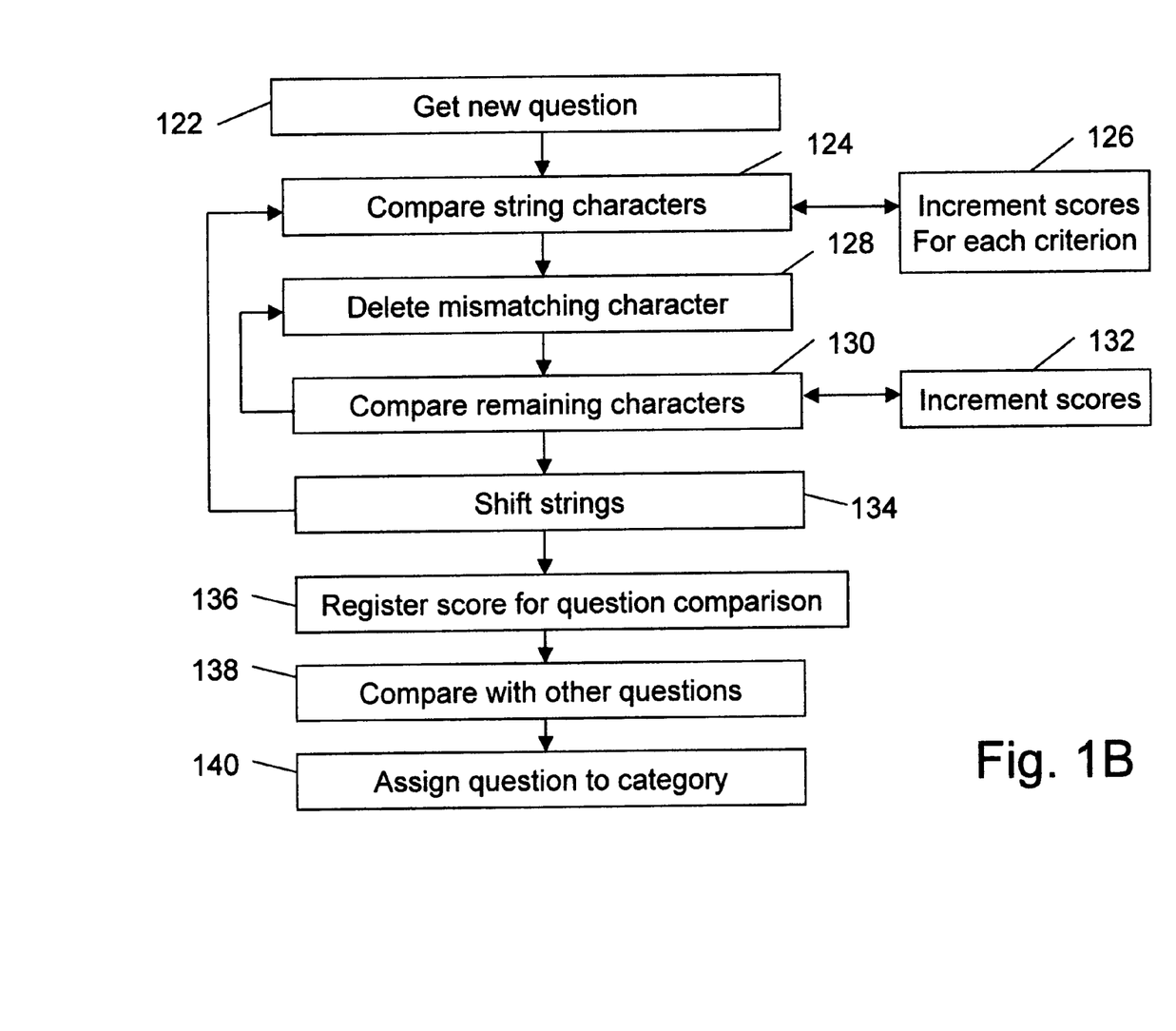
FIG. 1B illustrates an exemplary process for comparing questions using string comparisons in accordance with the present invention.

A string comparison may be further understood with reference to FIG. 1B. FIG. 1B illustrates an exemplary process for comparing questions using string comparisons in accordance with the present invention. Referring to FIG. 1B, a new question is received 122 by the system and compared against questions already in the system. Each question is represented by a string of ASCII characters representing letters, numbers, punctuation and spaces. Initially the characters for the new question are lined up one to one with the characters for an existing question 124. Where the characters match, a score is incremented 126 relating to the total number of matching characters. Where a continuous string of characters match, a different score component is incremented relating to the length of the continuous string 126. More than one continuous string may be identified and additional score components may be noted 126. Typically, the longest continuous string is the most significant.

For each mismatching character following a matching character, a test is made for added or deleted characters 128. For example, one question may use a plural form of a word. The "s" on the end would spoil a good run of matching text. To avoid this, the character following the mismatch may be examined for a match with the mismatched character. If there is a match, the remaining characters may be shifted to test for a continuation of the matching text as if the mismatching character were deleted 130. If more characters match, the continuous string may be given a higher score 132, and may be penalized slightly for having a mismatching character.

The process continues until the entire string is tested for match. Then, the strings are shifted relative to one another 134, i.e., one string may be rotated (shifted right with the last character wrapping around to the first position) and compared with the other string as above. The rotate and compare is continued until all shifts are tested. The best string matching score for all shifts would be the winning shift and represent the comparison of the two questions 136.

The process is continued for all other questions 138, resulting in a comparison score for each question relating to each other question. The new question may then be assigned to the category 140 of existing questions having the best match. A question may be assigned to several categories having a match above a predetermined threshold, or a new category may be defined if all matches are low.

String matching scores may be combined with word matching scores and/or content matching scores to determine the final comparison score between two questions.

Further details on computer assisted text analysis may be found in "Computer-Assisted Text Analysis (New Technologies for Social Research series)"
by Roel Popping, Sage Publications Ltd, Feb. 28, 2000, ISBN 0761953795.

The following US patent documents provide further details on methods of analyzing text, determining content, classifying text, organizing text, determining similarity, and other operations useful to one practicing the present invention. The following patent documents are hereby incorporated herein by reference:

U.S. Pat. No. 7,016,895 titled "Text-Classification System And Method", issued Mar. 21, 2006 to Dehlinger et al.

U.S. Pat. No. 6,990,628 titled "Method And Apparatus For Measuring Similarity Among Electronic Documents", issued Jan. 24, 2006 to Palmer et al.

U.S. Pat. No. 6,978,274 titled "System And Method For Dynamically Evaluating Latent Concepts In Unstructured Documents", issued Dec. 20, 2005 to Gallivan et al.

U.S. Pat. No. 6,970,881 titled, "Concept-Based Method And System For Dynamically Analyzing Unstructured Information", issued Nov. 29, 2005 to Mohan et al.

U.S. Pat. No. 5,371,807 titled "Method And Apparatus For Text Classification", issued Dec. 6, 1994 to Register et al.

U.S. Pat. No. 5,056,021 titled "Method And Apparatus For Abstracting Concepts From Natural Language", issued Oct. 8, 1991 to Ausborn.

Answer Delivery Process

Figure 2:
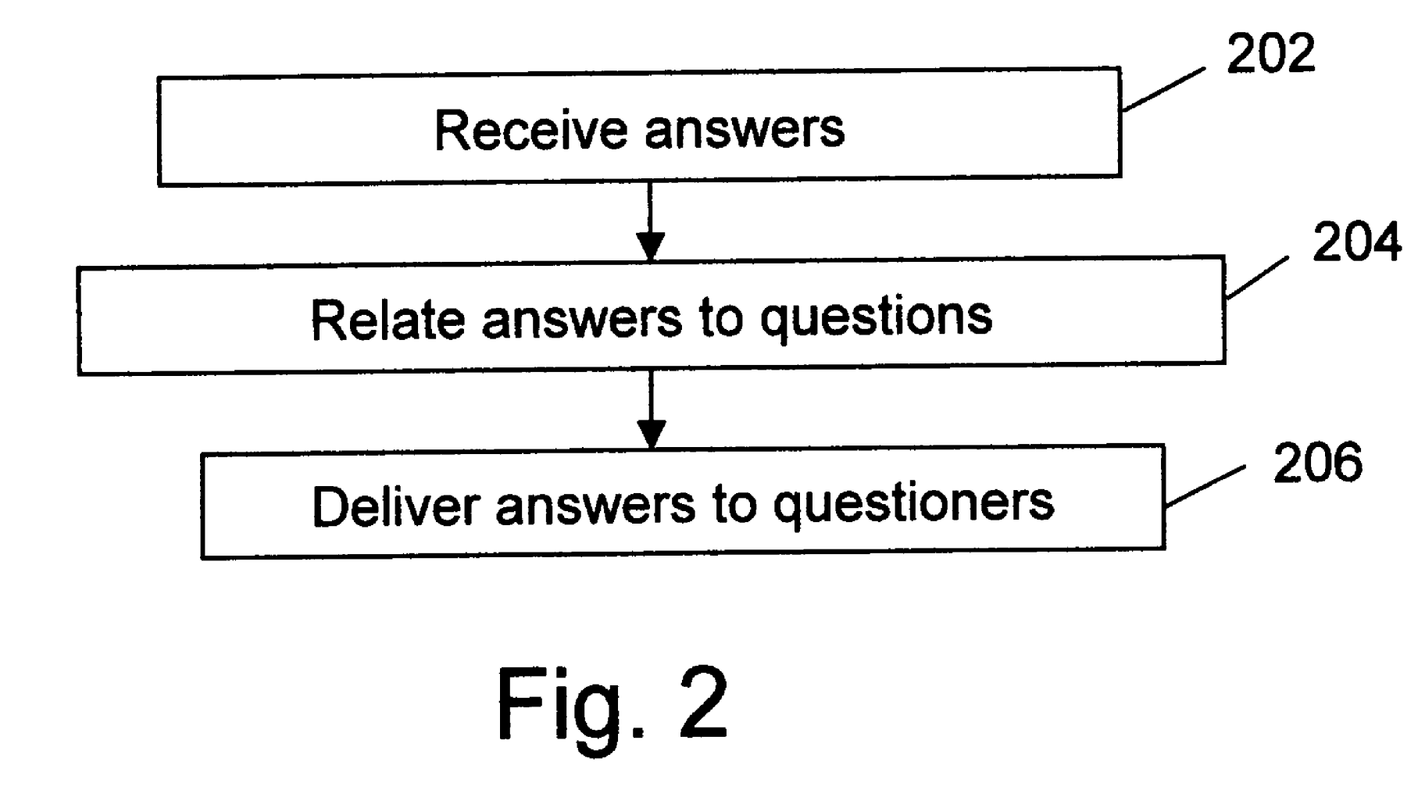
FIG. 2 illustrates the steps of an exemplary selective answer delivery process in accordance with the present invention.

FIG. 2 illustrates the steps of an exemplary selective answer delivery process in accordance with the present invention. Referring to FIG. 2, in step 202 one or more answers are received by the system. The answers are then related to the questions asked in step 204. When the question is identified, the original questioner may be found, and the answer may be delivered accordingly. The answers may be related to (or associated with) the questions asked by the relative time sequence of the question and answer, i.e., the response immediately following the particular question is likely to be the answer for the particular question. An answer may also be related to a particular question by common subject matter as identified by keywords and sentence structure. Thus, any passage in the interview matching the particular question may be delivered as an answer to the particular question. In step 206, the answers are delivered to the questioners whose questions were placed in the group that generated the representative question. Answers may be delivered by the same communications media used to ask the question or may be delivered by another media, as determined by the system or user preferences. For example, a question may be asked using a voice cell phone, and the answer later retrieved as a text email.

In one embodiment, further questions may be generated in response to an answer. The new questions may be processed and included in the list of representative questions or may be separately categorized and displayed so that the interviewer or interviewee may gauge the audience response to the interviewee response and adjust or amend the interviewee response to the question. Further, the system may allow the questioners or the general audience to rate an answer to a question. The ratings may then be collected and fed back to the interviewer or interviewee.

Figure 3:
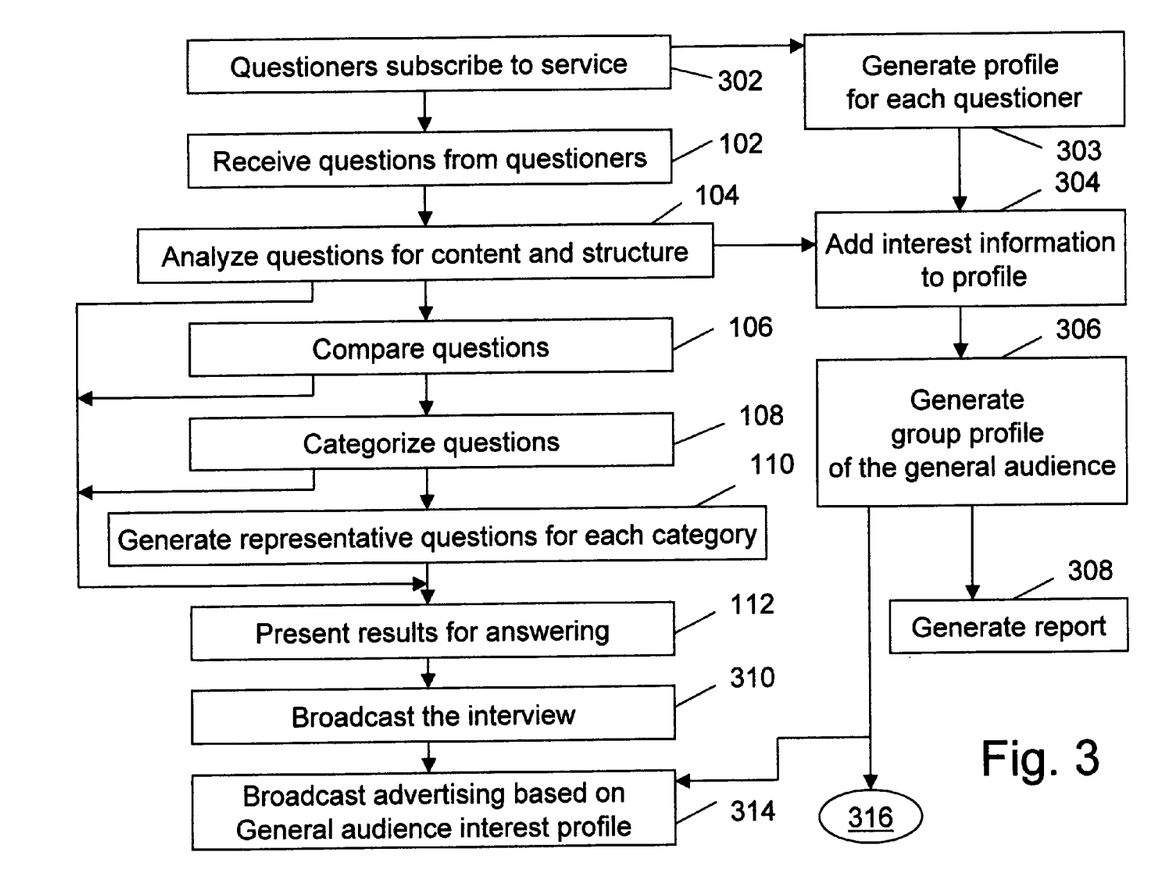
FIG. 3 shows the exemplary process of FIG. 1A including additional features.

FIG. 3 shows the exemplary process of FIG. 1A including additional features. Referring to FIG. 3, in step 302, the questioner may subscribe to a service for handling questions and answers in accordance with the present invention. Registration may link a subscription to one or more people who may use the account, and may link one or more input devices such as, telephone, cell phone, computer, or other device to the account. The account may be a paid account and link to billing information or may be a non-paying account. Accounts may have different privileges based on payment or information provided. The different privileges may include the scope of the events or celebrities covered, interface devices or media supported (voice, text, video), live or delayed response time, priority given to questions asked, or other features which may be included for the subscriber.

In step 303, information gathered during the registration process may be used to build a subscriber profile. Such information may include name, address, age, married status, education, favorite team, favorite anything, or any other information that the subscriber may provide. Individual subscriber profile information may be further compiled into a subscriber group profile of the population of subscribers. The subscriber group profile may include summary demographic information for geographical locations, age groups, team affiliation, or other group as desired.

When a questioner subscribes, an identification (ID) may be associated with the questioner. The identification may be simply a web address or a cell phone number or may include a name or other ID and may include a password or personal identification number (PIN) as required by the system operator. In one embodiment, the system may distinguish between various users of the same cell phone or computer. In practice, a spouse or a friend may be the one entering questions for the actual questioner. The system may ask the name of the questioner. If the name is different from the primary name for the account, then the system may build a profile for the secondary user of the account.

Steps 102-112 proceed much as in FIG. 1A. Reviewing these steps, once the account is set up, the server may receive a question from a subscriber 102. The system may be linked to a web site announcing and/or hosting an event, or the event may be broadcast by television, satellite, radio or other media. A subscriber having a question may contact the system via the media of choice and ask the question. The server then receives and processes the question 104. In one embodiment, various portions of steps 104-110 are bypassed and the results presented for answering 112. In another embodiment, the question may be further analyzed by the server by comparing with other questions to group the question with related questions 106. The groups of questions may then be arranged in order based on the number of related questions 108. Alternatively, the groups of questions may be arranged based on other priority criteria. In one embodiment, a representative question is generated for each group of related questions 110.

The questions, representative questions, and analysis results may then be presented by the server for answering 112

Using the analysis information from step 104, in step 304, the subject matter content of the questions may be used to generate interest information that is added to the questioner's profile. For example, a questioner may over time watch a number of football games and use the system to respond to interviews of coaches or players after a game. The questioner may ask more questions during the games associated with a particular football team and may ask more often about a particular player. The interest information would thus indicate special interest in the team and player identified.

In step 306, group interest information may be generated for a population. The population may be the population or audience of a particular interview, or may be for related interviews, or may be identified by geography or other property that can be identified. The group interest information is generated from the composite interest information for all related subscribers or questioners for a given subject matter. The group interest information may encompass multiple interviews and/or multiple subjects.

In step 308, a report is generated based on the group profile, including the group interest information. The report may be sold or subscribed to by advertisers for planning advertising, in particular for planning advertising to be delivered with the question and answer process.

In step 310, the interview may be broadcast. The broadcast medium may be commercial network TV, cable, satellite, etc, or by Internet, or by email or other broadcast medium. In step 314 advertising is broadcast based on the group profile. In one embodiment, the advertising is selected automatically based on the current values in the group profile. In another embodiment, the advertising is based on the report generated from the group profile. An advertiser may be charged for each targeted advertisement delivered by the system based on the group profile.

Note that the sequence in FIG. 3 (and the other figures) represents general relationships and may be varied by one skilled in the art based on teachings herein. For example, the broadcasting of advertising may be before, during, or after the interview. Broadcasting of advertising based on the group profile may occur before the interview if based on the profile generated over time on similar interviews or based on subscriber information provided before the interview questions and answers. Similarly, the presentation of advertising, before questions are asked to individual subscribers may be based on prior generated profile for that subscriber or based on the group profile for the general interest group developed from prior interviews.

Figure 4:
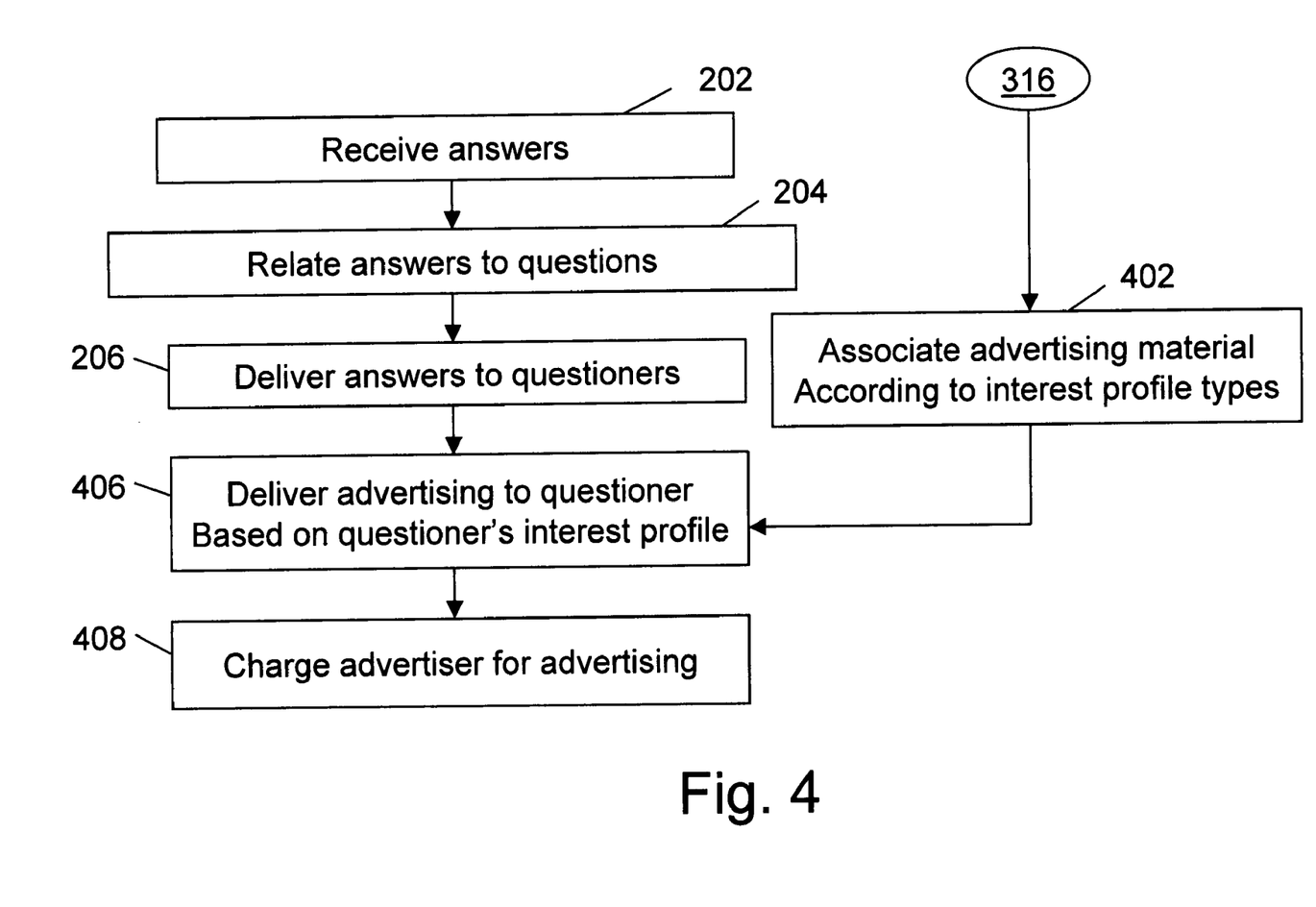
FIG. 4 shows the exemplary answer process of FIG. 2 with additional features.

FIG. 4 shows the exemplary answer process of FIG. 2 with additional features. Referring to FIG. 4, Steps 202 to 206 are as in FIG. 2. Reviewing these steps, once the server presents the questions for answering, the speaker or interviewee then answers the questions and the server then records the answers 202. The interview may be taped or otherwise recorded. The recording may include video or the answers may be typed into a computer. Answers are then matched with the subscriber asking the associated question 204. The answers are then made available to subscribers. The answers may be broadcast and/or placed on the server for the subscribers to access either by logging in via a web site or by telephoning in using a phone or cell phone. Answers may also be delivered as email or text messaging or other media types. Connection 316 with the 316 line in FIG. 3 brings the profile information into step 402 where advertising messages are associated with profile information. For example, advertising for memorabilia for a particular team is associated with a showing of interest in the particular team in the interest information. Step 406 delivers the advertising to the questioner based on the individual questioner's profile and interest information. Thus, a questioner who asks more frequently about team A will receive advertising for memorabilia associated with team A. The profile information may be combined with other knowledge, such as "people who are interested in X buy Y" to offer Y to a particular questioner. Since only individuals interested in a given product are shown the advertisement for the product, the server may charge the advertiser for each delivery of a targeted advertisement 408.

Figure 5:
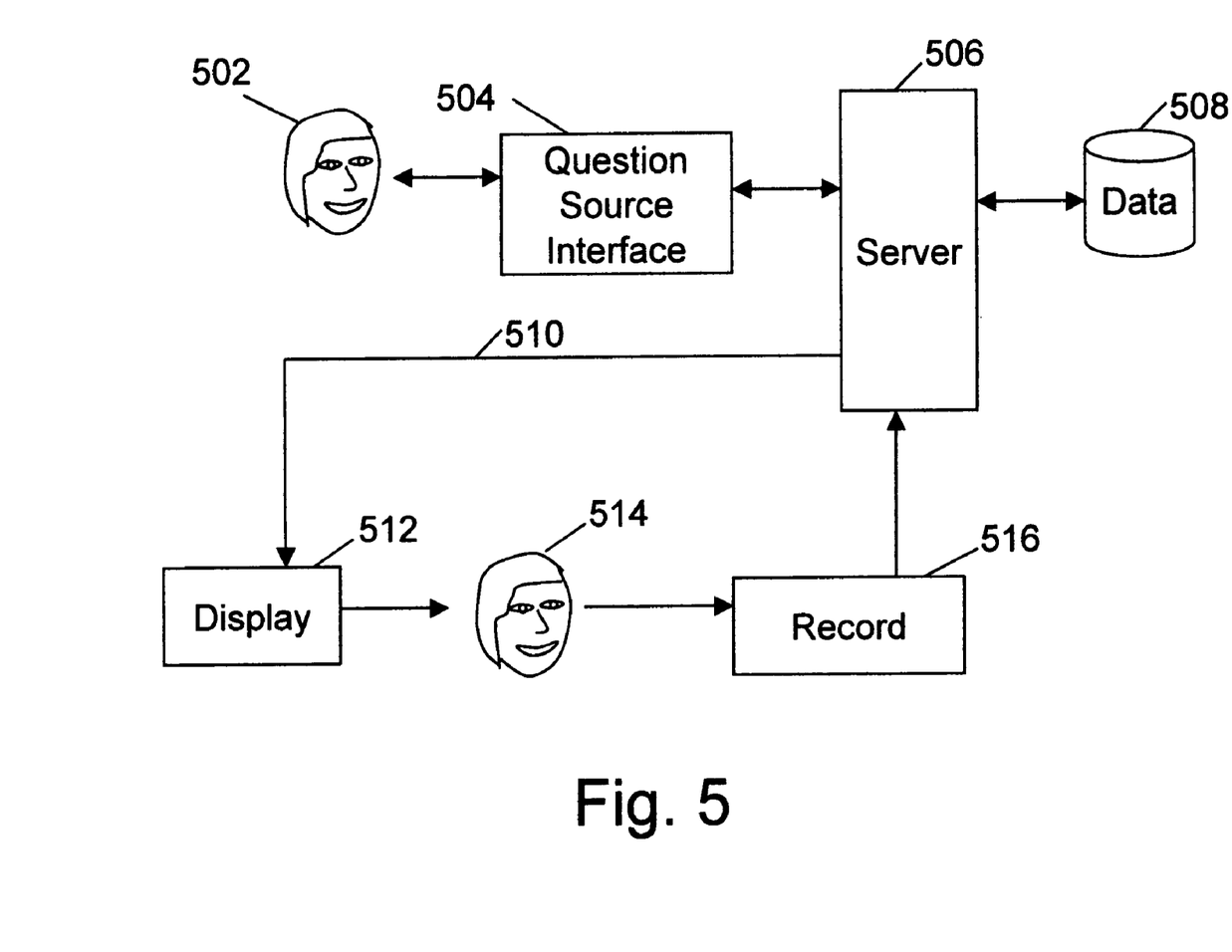
FIG. 5 is a simplified system block diagram for an exemplary question processing system in accordance with the present invention.

FIG. 5 is a simplified system block diagram for an exemplary question processing system in accordance with the present invention. Referring to FIG. 5, questions from a questioner 502 are entered through a question source input device and interface 504, which may be a cell phone or computer or similar such device. A central server 506 is used to receive the questions and process the questions. The server 506 includes interface devices as necessary to interface to the question source 504 and deliver answers back to the questioner 502. The server 506 also includes any computer data 508 including databases, table data, and data files needed including but not limited to: historical profiles, dictionaries with grammar information for parsing sentences, a thesaurus for identifying synonyms, misspelling tables, subscriber and advertiser account files for generating charges associated with the service, advertising material for delivering to subscribers and any other information, files, and data needed for the system. The server 506 includes any text to speech and/or speech to text processing devices needed. The server 506 includes the processing capability to analyze and compare sentences and generate the representative sentences to be displayed for answering. The server performs this processing and then displays the representative questions on a display monitor 512. The questions are then used directly or incorporated into an interview and the results of the interview are then recorded 516 or broadcast or both. The results including answers to the questions may be input back to the server 506 for relating to the questions and delivery to the respective questioners 502. Note that the server 506 and associated data may span a single computer or multiple computers interfaced over a network, such as an enterprise network or the Internet and different elements may reside in different buildings, cities, states, or countries.

Figure 6:
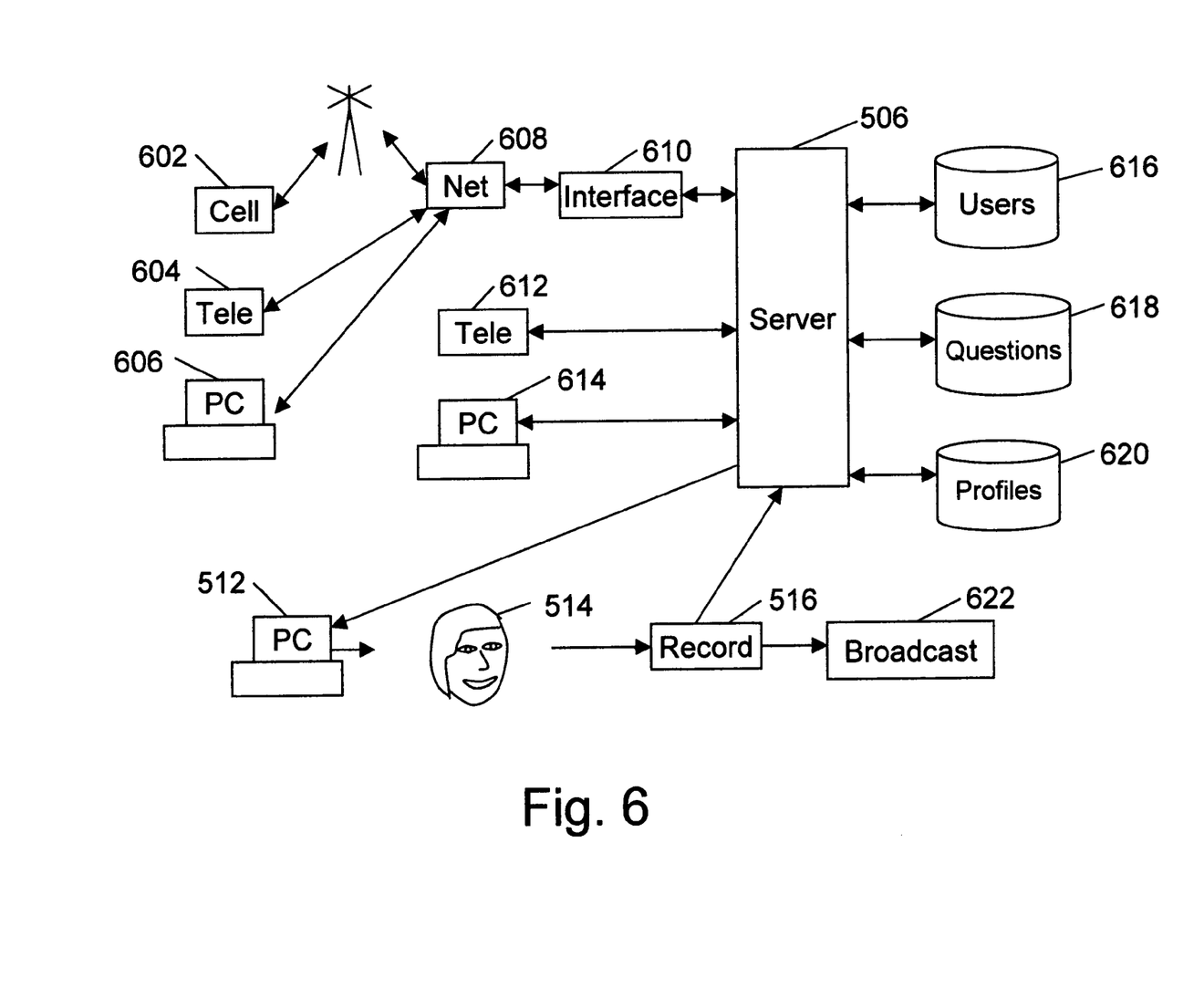
FIG. 6 is a system block diagram of the exemplary system of FIG. 5 showing further features and detail.

FIG. 6 is a system block diagram of the exemplary system of FIG. 5 showing further features and detail. FIG. 6 shows the question input and answer output medium to be potentially a cell phone 602, a telephone 604, or a PC 606. These devices may be input over a telephone network 608 or a directly connected telephone 612 or computer 614 may input to the server 506. Cell phone 602, 612 and PC 604, 614 input may include, by way of example and not limitation, email, text messaging, voice, voice over IP, web site form, or other method yet to be devised. The server 506 includes any format conversion device or software necessary to convert an input format to the format used for analysis, typically text, and from the analysis format to the desired received format for the answers. The server 506 is shown with a database linked to table data for users 606, questions 608 and profiles 620. Other databases and files as necessary can be included. The representative questions are output through a PC display 512 and the interview is recorded in a recorder 516, or within the server, and may be broadcast through a broadcast interface 622. The interview recording and/or broadcasting may include video information as well as audio speech and/or text.

Figure 7:
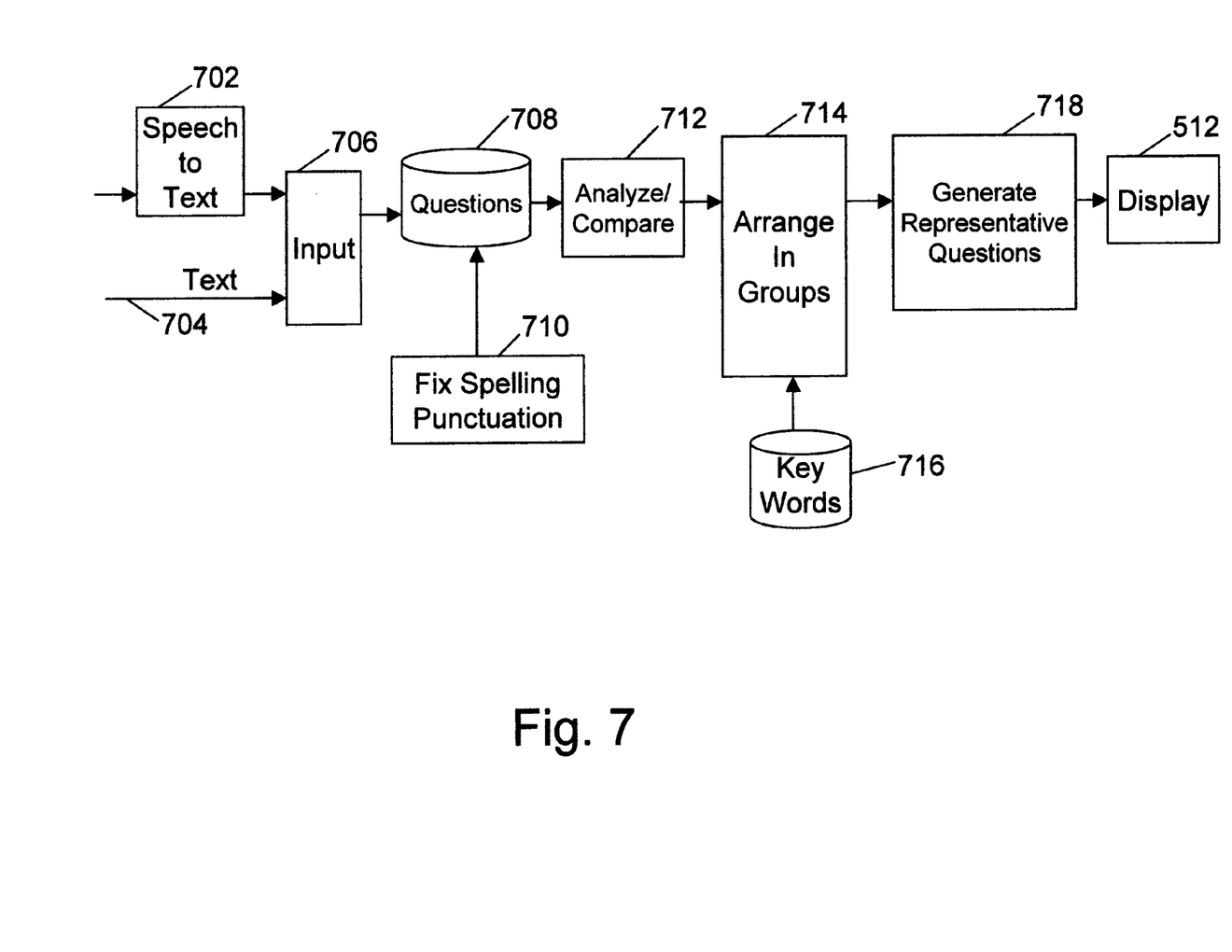
FIG. 7 shows an exemplary question processor in accordance with the present invention.

FIG. 7 shows an exemplary question processor in accordance with the present invention. Referring to FIG. 7, the questions arrive as speech 702 and are converted to text, or arrive as text 704 and are fed 706 to a question data table 708. The input questions are then corrected 710 to fix spelling, punctuation, or wording. If the correction presents ambiguities, the questioner may be asked to verify the correction or to select among several correction choices.

The question is then analyzed 712 by finding synonyms and determining sentence structure properties. The questions are then placed in groups 714 based on subject matter 716 content. From each bin 714 a representative question 718 is generated and then displayed 512.

Figure 8:
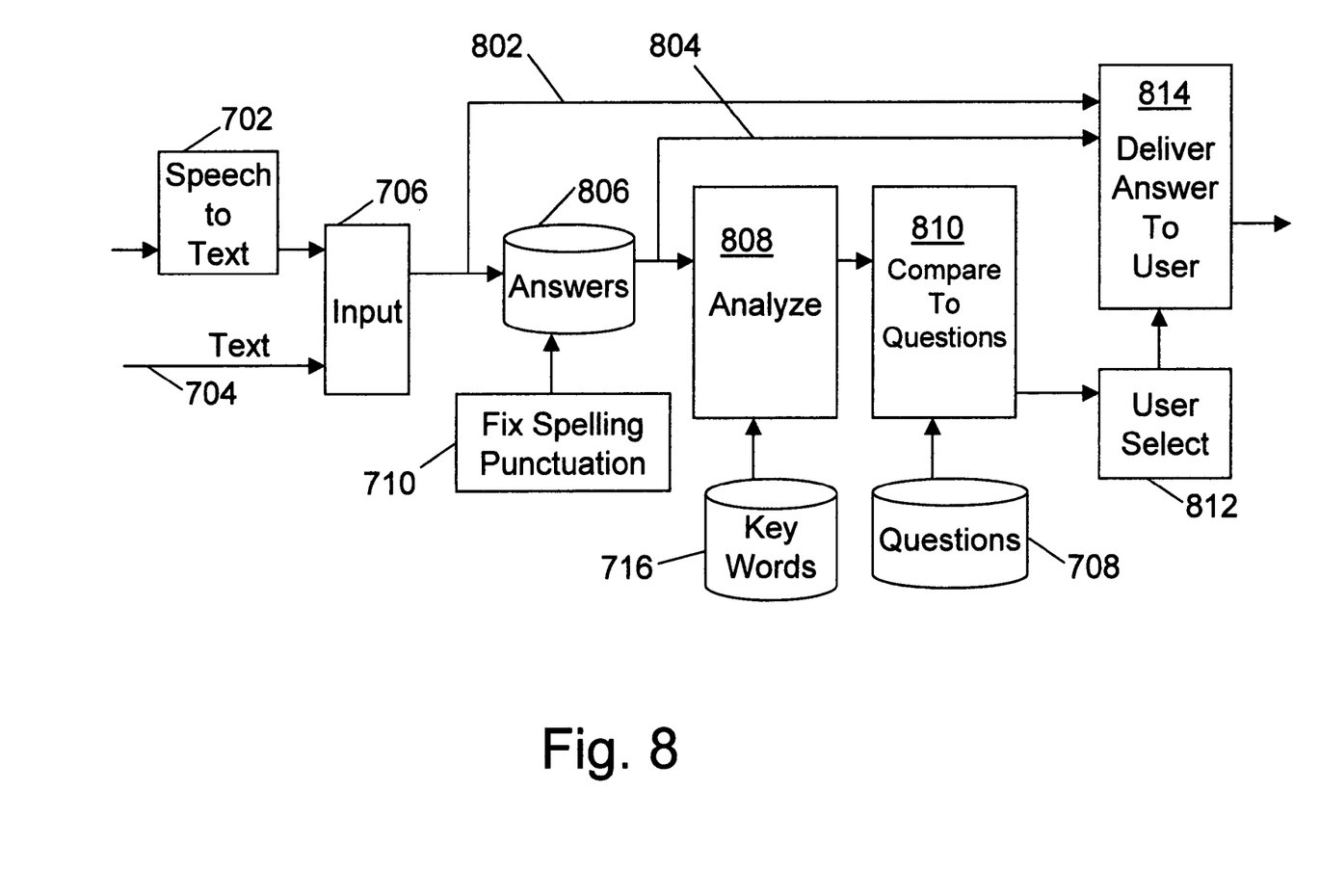
FIG. 8 shows an exemplary answer processor in accordance with the present invention.

FIG. 8 shows an exemplary answer processor in accordance with the present invention. The answers are input 706 as speech 702 or text 704 and corrected 710 for spelling or other faults and placed in an answer database or file 806. The answers are then analyzed 808 and compared 810 with the questions 708. When a match is found, the questioner that asked the question 812 is provided 814 the answer. Text matching the question may be determined by relative timing of the question and answer or by common subject content. The answer may be provided in its raw uncorrected form 802 or in the corrected form 804 as desired by the user or established by the system operator. In one embodiment, associated video is also provided along with the answer.

Use of the Question and Answer Process

The question and answer process may be utilized in a wide range of scenarios from broadcast interviews to classroom education. The scenarios may include, by way of example and not limitation, a sports interview or game coverage (football, basketball, NASCAR, hockey, etc.), a news interview, a celebrity interview, a TV talk show, a seminar, customer satisfaction surveys, or other situation involving an audience with multiple questioners and multiple questions to be answered.

In one embodiment, the question and answer process may be offered as a service with subscribed customers asking questions and receiving answers. The subscribers may have access to different levels of service in accordance with the level of subscription. A higher level of subscription may offer more events, give a higher priority to the questions asked, allow viewing of more or all questions and answers, allow cell phone or video media, or other privileges.

On a TV talk show, the host may begin with a predetermined set of questions or conversation starters. The audience, and TV audience may then send responses that may be incorporated into the interview process as the interview progresses. The audience responses may also be used to gauge audience response after the program is over to determine success and plan for future programs.

In sports casting, a subscription service may offer an after game debriefing by a renowned sports figure. Subscribers enter their questions as the game progresses. After the game, the sports figure reviews the questions as processed and organized by the server. The sports figure then stages an interview in front of a camera where the questions are answered. The interview may include an interviewer or other supporting content as desired. When completed, the interview video is made available to the subscribers as a downloadable file to be viewed on a cell phone or computer. The server may also convert the voice portion to a text transcript.

In a teaching seminar, particularly one broadcast or over the Internet, the instructor may not have the view of a lot of blank faces to clue in on the fact that nobody is getting it. With the system in place, students could ask questions at anytime without interrupting the presentation. A monitor showing a list of questions and associated number of people asking each question may give clues that more time is needed on a particular point. Further, students may feel more comfortable asking questions when they are not spotlighted, so to speak, by taking class time to interrupt the presentation to ask a personal question. The instructor may view all questions on the display together with the number of people asking each question and respond as appropriate for each question. Some may be answered immediately; others at a later time, and still others may suggest personal tutoring.

In a political forum, a politician may wish to understand the views of his or her constituency on a particular issue or set of issues. The politician may give a speech at some location. Typically, after a speech, a politician may ask for questions from the audience. Instead of answering a question or two, in accordance with the present invention, all participants may ask as many questions as they wish. All questions from all participants may then be processed to determine the hottest issues for the audience. The question processing in accordance with the present invention would be especially valuable for a webinar (web seminar), where a massive number of questions would likely be generated. The hot button issues may then be answered in real time and follow-on questions asked by the audience. The follow-on questions will likely give an indication as to the effectiveness of the first answers and will likely provide insight into any inadequacy in the first responses enabling the politician to refine the answers to fill in the missing material. The missing material can be filled in interactively with the audience during the first event. Later, during a second event when the question comes up again, the full answer may be given the first time.

A corporation may utilize the invention to process questions during an investor's conference call or shareholder's meeting. Thus, questions from thousands of investors may be processed and included in the proceedings even though a very limited time may be available.

CONCLUSION

The present invention enables a question and/or answer processing system that provides numerous advantages to all participants.

The questioner has direct input to the questions being asked. The questions may be asked in real time and receive answers immediately. The questioner may utilize any convenient format from cell phone to personal computer, voice to text input allowing participation at a game, in the car, or at home.

The interviewer receives real world questions prioritized according to audience interest and demand.

The celebrity has direct access to fans in real time, receives real world questions, and may receive responses on the answers given in real time allowing corrective action.

Advertisers receive demographics related to the questioners. Questions asked provide insight into the interests of the audience and may deliver automated targeted advertising to the audience or to individuals in the audience.

The invention offers the potential for a new mode of real time, interactive communication between a speaker and an audience, bringing fans and stars, teachers and students, representatives and constituents closer together by facilitating communication between them.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer based method for assisting communications between a speaker conducting an interview of an interviewee and an audience of the interview by generating representative questions from the audience, the method comprising the steps of:

conducting an interview during a time period corresponding to real time;

receiving during the time period at a central processing server incoming questions during the time period from a plurality of audience members, thereby obtaining a plurality of audience generated questions; and distilling at a rate substantially corresponding to the rate the questions are received the plurality of audience generated questions to a substantially smaller number of representative questions while also providing at the same rate information indicative of the questions most asked by the audience, the distilling comprising:

generating an analysis of the incoming questions at the central processing server, the analysis being updated substantially continuously at the rate that the questions are received, the analysis comprising grouping the incoming questions into groups of related questions, indicating the number of questions in each group of incoming questions, and generating a representative question for each group of incoming questions to yield the substantially smaller number of representative questions and the information indicative of the questions most asked by the audience which together indicate the full range of interests of the audience and the focus of greatest interest in groups of incoming questions, and generating results of the analysis and substantially continually updating the results during a substantial portion of the time period and providing the representative questions including the results and updates and the information indicative of the questions most asked by the audience on an ongoing and substantially real time basis to the speaker for presentation to the interviewee to enable interactive communication between the interviewee and substantially a whole of the audience by providing to the interviewee information about the full range of interests of the audience and the focus of greatest interest in groups of incoming questions.

* * * * *